United States Patent
Gandhi et al.

(10) Patent No.: US 11,201,806 B2
(45) Date of Patent: *Dec. 14, 2021

(54) AUTOMATED ANALYSIS AND RECOMMENDATIONS FOR HIGHLY PERFORMANT SINGLE PAGE WEB APPLICATIONS

(71) Applicant: salesforce.com, Inc., San Francisco, CA (US)

(72) Inventors: Sharad Gandhi, Los Gatos, CA (US); Mathew Kurian, San Mateo, CA (US); Francis J. Leahy, III, Mill Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,317

(22) Filed: Jun. 16, 2020

(65) Prior Publication Data

US 2020/0313994 A1 Oct. 1, 2020

Related U.S. Application Data

(63) Continuation of application No. 15/499,416, filed on Apr. 27, 2017, now Pat. No. 10,721,152.

(51) Int. Cl.
G06F 15/16 (2006.01)
H04L 12/26 (2006.01)
H04L 29/08 (2006.01)

(52) U.S. Cl.
CPC ........ H04L 43/0876 (2013.01); H04L 43/045 (2013.01); H04L 67/02 (2013.01); H04L 67/36 (2013.01)

(58) Field of Classification Search
CPC ... H04L 43/045; H04L 43/0876; H04L 67/02; H04L 67/42
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — Moustafa M Meky
*Assistant Examiner* — Thorne E Waugh
(74) *Attorney, Agent, or Firm* — LKGlobal | Lorenz & Kopf, LLP

(57) ABSTRACT

A method in an analysis tool for dynamically analyzing client-side performance during the rendering of web content is provided. The method comprises automatically capturing data while a client application executes executable code written in a scripting language to render a web page wherein the data identifies components that are created, the execution time for creating each component, the execution start time for each component, and the components that are initially visible when the web page is rendered by the client application. The method further comprises analyzing the captured data as the data is captured to determine a plurality of factors that include the scripting language cycle duration, the identification of redundant code executions, and the prioritization and ordering of code module execution. The method further comprises generating a metric using the factors that characterizes the performance of the client application during web page rendering and displaying the metric.

20 Claims, 7 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,519,571 B1 * | 2/2003 | Guheen .................. G06Q 30/02 705/14.66 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,374 B2 * | 8/2004 | Nichols .................. G09B 7/04 706/15 |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,315,826 B1 * | 1/2008 | Guheen .................. G06Q 10/06 705/7.29 |
| 7,340,411 B2 | 3/2008 | Cook |
| 7,353,272 B2 * | 4/2008 | Robertson ............ H04L 41/022 709/202 |
| 7,356,482 B2 | 4/2008 | Frankland et al. |
| 7,373,272 B2 * | 5/2008 | Gualtieri ................ G01B 7/003 324/633 |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,196,205 B2 * | 6/2012 | Gribble ............... G06F 9/45558 726/24 |
| 8,209,308 B2 | 6/2012 | Rueben et al. |
| 8,230,333 B2 * | 7/2012 | Decherd ............ G06F 16/9537 715/243 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,533,141 B2 * | 9/2013 | Doig .................. G06Q 10/0633 706/47 |
| 8,539,336 B2 * | 9/2013 | Griffiths ............. G06F 40/143 715/230 |
| 8,566,301 B2 | 10/2013 | Rueben et al. |
| 8,646,103 B2 | 2/2014 | Jakobson et al. |
| 8,713,536 B2 * | 4/2014 | Everly ................... G06Q 30/02 717/127 |
| 9,131,002 B2 * | 9/2015 | Smacinih ............... H04L 67/22 |
| 9,241,044 B2 * | 1/2016 | Shribman ............. H04L 67/32 |
| 9,305,053 B2 * | 4/2016 | Nandy .................... H04L 43/04 |
| 9,923,793 B1 * | 3/2018 | Gore ..................... H04L 67/42 |
| 9,946,746 B2 * | 4/2018 | Hong ................ G06Q 30/0201 |
| 9,973,568 B2 * | 5/2018 | Letca .................. G06F 11/3466 |
| 9,990,422 B2 * | 6/2018 | Chang ................. G06F 16/35 |
| 10,073,979 B2 * | 9/2018 | Von Kaenel ........... G06F 16/00 |
| 10,235,681 B2 * | 3/2019 | Chang ................. G06F 40/237 |
| 10,339,546 B2 * | 7/2019 | Dereszynski ....... G06Q 30/0204 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobsen |
| 2009/0177744 A1 | 7/2009 | Marlow et al. |
| 2010/0251128 A1* | 9/2010 | Cordasco ............... H04L 67/125 715/736 |
| 2010/0318976 A1* | 12/2010 | Everly .................... H04L 67/22 717/141 |
| 2011/0022704 A1* | 1/2011 | Duan ....................... H04L 67/22 709/224 |
| 2011/0191671 A1* | 8/2011 | Hammond ............ G06F 40/166 715/269 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobsen et al. |
| 2013/0091578 A1* | 4/2013 | Bisht ....................... G06F 21/53 726/25 |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0235044 A1* | 9/2013 | Kaleta ................... G06F 3/0481 345/473 |
| 2013/0247216 A1 | 9/2013 | Cinarkaya et al. |
| 2013/0297647 A1* | 11/2013 | Nandy ............... G06Q 30/0201 707/769 |
| 2014/0123037 A1* | 5/2014 | Lee ....................... G06F 16/957 715/760 |
| 2014/0223005 A1* | 8/2014 | Everly .................... H04L 67/22 709/224 |
| 2014/0244830 A1* | 8/2014 | Smacinih ................ H04L 67/22 709/224 |
| 2015/0081389 A1* | 3/2015 | Dereszynski ...... G06Q 30/0204 705/7.33 |
| 2015/0304398 A1* | 10/2015 | Letca ....................... H04L 67/10 709/203 |
| 2017/0220612 A1* | 8/2017 | Crossley ............... H04L 65/4084 |
| 2017/0310791 A1* | 10/2017 | Palse ..................... H04L 67/322 |

* cited by examiner

AUTOMATED ANALYSIS AND RECOMMENDATIONS FOR HIGHLY PERFORMANT SINGLE PAGE WEB APPLICATIONS

CROSS-REFERENCE TO RELATED APPLICATION

This application claims the benefit as a continuation of U.S. patent application Ser. No. 15/499,416, having the same title as this application, and filed on Apr. 27, 2017. This application incorporates the prior application into the present application by reference.

TECHNICAL FIELD

Embodiments of the subject matter described herein relate generally to web content rendering, and more particularly, to methods and systems for improving client-side web page rendering performance.

BACKGROUND

A scripting language such as JavaScript may be used for the design of a web page or web application (web app). A web app may be configured such that a web server renders part of the content to be displayed and a client application executes executable scripting instructions to render the rest of the content to be displayed. JavaScript is a common language that may be used on both the client-side and the server-side to render the display of a web app.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

A scripting language such as JavaScript may be used for the design of a web page or web application (collectively referred to herein as web app). A web app may be configured such that a web server renders part of the content to be displayed and a client application executes executable scripting instructions to render the rest of the content to be displayed. Single page apps are an example of web apps that may include both client-side and server-side processing to render content displayed by a client application. JavaScript is a common language that may be used on both the client-side and the server-side to render the display of a web app, such as a single page app.

Frameworks, such as a JavaScript framework, can be used by a web app designer to speed up web app development. The framework can provide a template for a web app, such as a single page app, and may allow a web app developer to focus less on code structure and more on the specific content to be displayed. Use of a framework, however, may result in code that is not written as concisely as it could (e.g., code bloat), code that may not execute as efficiently as it could, and code whose execution order is not optimized, among other things.

The subject matter described herein discloses apparatus, systems, methods, techniques and articles for automatically and dynamically analyzing the client-side performance of a web app and providing recommendations to a web app designer to improve the functioning of the web app. An analysis tool is provided that can automatically analyze web page loading on the client-side and provide data and/or recommendations a web app designer can use to improve web app performance on the client-side. The analysis tool may also provide an always-on profiling capability that allows a web app designer to view code performance characteristics without having to specifically direct the tool to capture and record data. The analysis tool may also provide the capability for a web designer to access scripting code resident in memory on the client-side, modify the code resident in the memory, and run the modified code resident in the memory to test possible changes before making a change to the code resident on the server-side.

Figure 1:
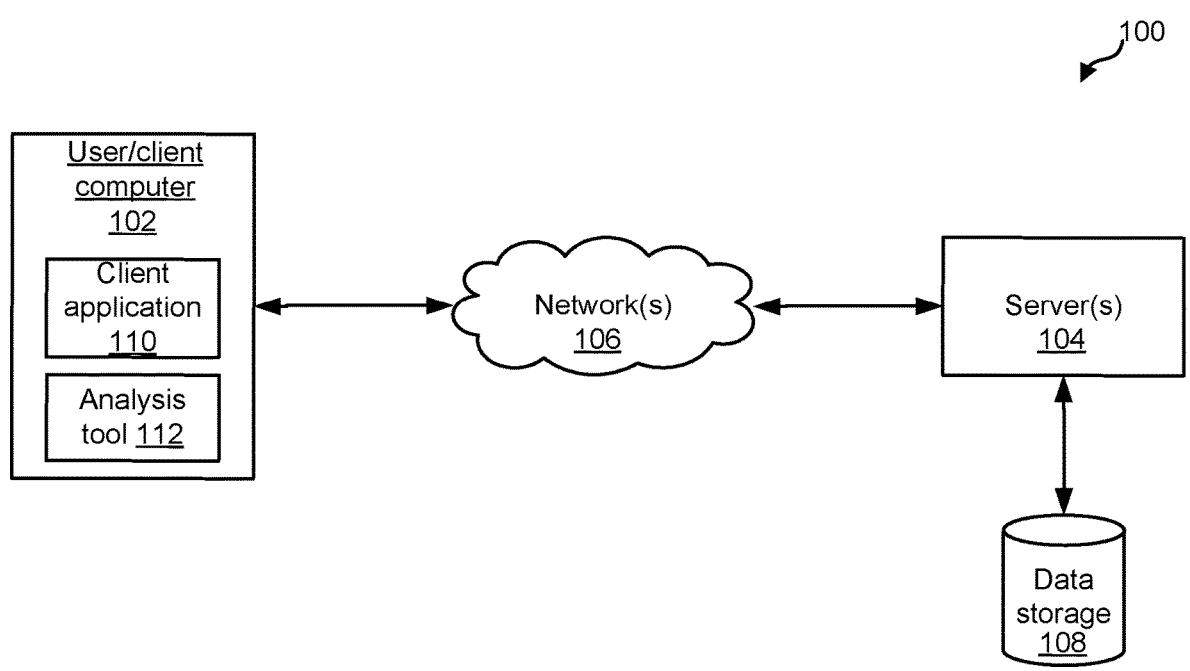
FIG. 1 is a block diagram of an example computing environment that can be used to implement aspects of the current subject matter, in accordance with some embodiments.

FIG. 1 is a block diagram of an example computing environment 100 that can be used to implement aspects of the current subject matter. The example system includes one or more user or client computers 102 that communicate with one or more web servers 104 via one or more networks 106. The web server 104 is coupled to a data store 108 that may store information resources that may be requested by a client application 110 that executes on a client computer 102. The information sources may include web apps, single page web apps, or other content that include executable scripting instructions requiring both client-side and server-side processing to render a display by a client application 110 on a client computer 102.

The example client computer 102 also includes an analysis tool 112 that can provide a developer of web content with data and recommendations for improving the performance of web content under development. The analysis tool 112 can be implemented as a plug-in to many different types of client applications that may display web content, such as a web browser, a mobile application, and an integrated development environment (IDE) such as a JavaScript framework. The analysis tool 112 may also be implemented as a standalone application. The techniques described herein are applicable to an analysis tool 112 implemented as an extension to a client application as well as a standalone application.

The example analysis tool 112 can inject itself into a web page load process when a client application begins to load a web page. The example analysis tool 112 can gather data based on critical and/or high frequency code execution paths. The example analysis tool 112 can identify code execution paths that lead to user visible content in order to optimize perceived performance. The example analysis tool 112 can identify code execution paths that are redundant and wasteful of resources such as CPU cycles and memory usage/access. The example analysis tool 112 can identify overloaded network requests that lead to long response times/large response sizes and perform analysis to determine if the network requests can be better batched. The example analysis tool 112 can identify code paths that lead to multiple expensive browser render operations and perform analysis to determine if these code paths can be better batched. The analysis example tool 112 can identify resources such as images, scalable vector graphics (svg), JavaScript (js), and cascading style sheet (css) requests whose delivery can be improved via minification, compression or better cacheability.

Figure 2:
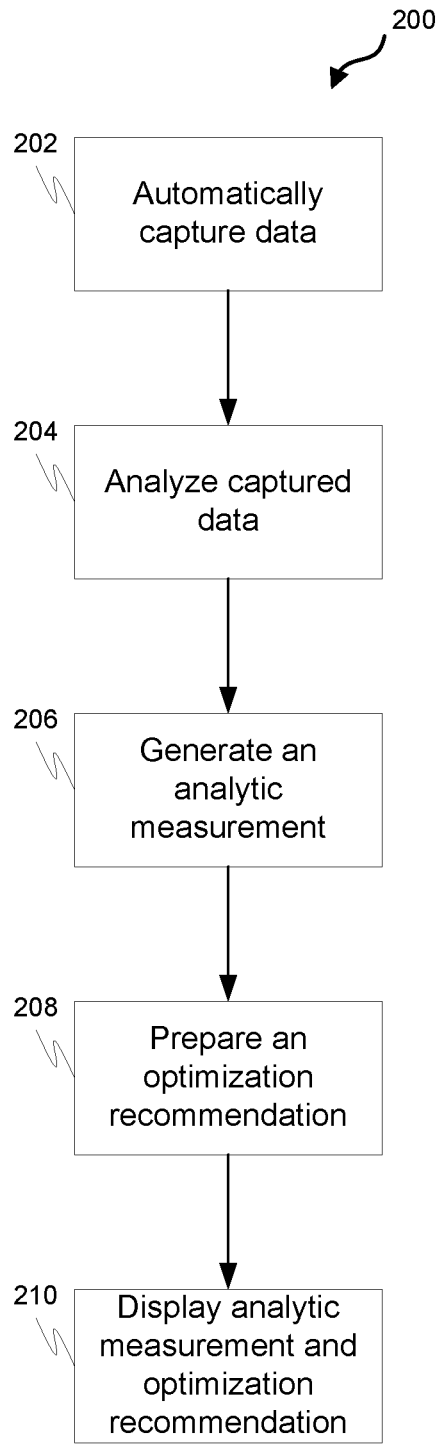
FIG. 2 is a process flow chart depicting an example process performed by an example analysis tool, in accordance with some embodiments.

FIG. 2 is a process flow chart depicting an example process 200 performed by an example analysis tool. The example analysis tool runs in connection with a client application that access a web resource, either as an extension to the client application or as a standalone application. The example tool runs when a user accesses web content without the user having to instruct the tool to capture data during web interactions.

In the example process 200, the analysis tool automatically captures client computer performance data (operation 202) when a client application processes a response to a request for a web resource from a web server, e.g., when a web browser renders a web page. The captured data may include data identifying the components that are created, e.g., software components created from executing a scripting language such as JavaScript found in the retrieved web resource. The captured data may also include the execution time for the client application to create each component and the execution start time for each component. The captured data may also include the identity of the components that are initially visible in the user interface of the client application when a web resource, such as a web page, is rendered by the client application.

In the example process 200, the analysis tool automatically and dynamically analyzes the captured data in real time to determine a plurality of factors (operation 204). The analysis tool may begin analyzing the captured data without the user having to instruct the tool to analyze the data. The analysis may be done in the background without a visual indication to the user that the analysis is taking place. The factors determined by the analysis tool may include the scripting language cycle duration, the identification of redundant code executions, the prioritization and ordering of code module execution, and others.

Based on the determined factors the analysis tool may generate an analytic metric (operation 206). The analytic metric may include an insight score that provides an indication of the impact of the factors on the performance of the client application in rendering the web page. The insight score may be determined by combining a number of the factors in a formulaic fashion. The insight score may help promote developer best practices and may also allow for performance ranking/comparison of different pages. The analytic metric may also include a loading progress chart that illustrates the relative priority given to visible components and hidden components during web page rendering. Additionally, the analytic metric may include a timeline that includes a CPU profile of component activity during the rendering of the web page and a memory snapshot that depicts the components loaded during the rendering of the web page.

Based on the generated analytic metric, the analysis tool may prepare an optimization recommendation (operation 208). In one example, the analysis tool may recommend a change in component creation or rendering order to prioritize the rendering of visible components before hidden components to make a web app appear to load faster. The analysis tool can display the analytic metric and optimization recommendation in a user interface display window of the client application or the analysis tool (operation 210). The analytic metrics and the optimization recommendations can be provided without a user having to perform manual instrumentation of its JavaScript code. The analysis tool may be extensible to support multiple client-side frameworks.

Figure 3:
FIG. 3 is a screenshot of an example display window depicting example analytic metrics, in accordance with some embodiments.

FIG. 3 is a screenshot of an example display window 300 depicting example analytic metrics. The example window 300 includes a first pane 302 that displays a plurality of selectable analytic metric titles 304. In this example, the Progressive Rendering analytic metric title 306 is selected as illustrated by the highlighting surrounding the Progressive Rendering analytic metric title 306 in the first pane 302. The example window includes a second pane 308 that lists the title of the selected analytic metric, a description of the information the analytic metric provides, and an insight score 309 for the analytic metric. The example window 300 also includes a third pane 310 that provides descriptive information regarding results from web page rendering and a wireframe 314 that illustrates the visible components 316 and hidden components 318 in the web page.

The example window 300 further includes a fourth pane 312 that provides a hidden versus visible component loading progress chart 320. The loading progress chart 320 illustrates the percentage of visible and hidden components created at different times during web page rendering. The example loading progress chart includes a hidden component line graph 322 illustrating the percentage of hidden components created at different times and a visible component line graph 324 illustrating the percentage of visible components created at different times in the web page rendering cycle. In this example, the hidden and visible components are rendering at approximately the same rate. The analysis tool may recommend that the rendering order of specific code be modified to render more of the visible components first and the hidden components later.

The example progressive rendering analytic metrics are generated by the automatic capture of data during web page rendering. The data captured may identify components that are created during web page rendering, the execution time for creating each component, the execution start time for each component, and the components that are initially visible when the web page is rendered by the client application. The captured data may be analyzed to generate factors that identify the scripting language cycle duration, the identification of redundant code executions, and the prioritization and ordering of code module execution. The generated factors may be used to prepare the progressive rendering analytic metrics.

Additional factors that may also be generated and used for generating analytic metrics and recommendations include an inefficient memory usage analysis factor, a factor identifying code paths that lead to multiple expensive browser render operations and whether these code paths can be better batched, a server time factor, a network overhead factor, a factor identifying overloaded network requests that lead to long response times or large response sizes and whether these network requests can be better batched, and a factor identifying resources such as images, scalable vector graphics (svg), JavaScript (js), and cascading style sheet (css) requests whose delivery can be improved via minification, compression or better cacheability.

Figure 4:
FIG. 4 is a screenshot of an example display window depicting an example timeline metric that illustrates example always-on CPU and memory profiling, in accordance with some embodiments.

FIG. 4 is a screenshot of an example display window 400 depicting an example timeline metric that illustrates example always-on CPU and memory profiling. The example display window includes an example timeline 402 that includes an example snapshot interval 404, an example CPU profile 406 of component activity during the snapshot interval, and an example memory snapshot 408 during the snapshot interval. The example CPU profile 406 includes a description that highlights key component lifecycle events. The example memory snapshot 408 depicts components loaded during web page rendering. When the analysis tool is configured to automate the instrumentation of a framework, the CPU profile description and the memory profile description may include higher level component names that are recognizable within the context of the framework instead of machine level component names.

The timeline may be generated through the automatic capture of data during web page rendering. The data captured may identify components that are created during web page rendering, the execution time for creating each component, the execution start time for each component, and the components that are initially visible when the web page is rendered by the client application.

The always-on profiling capability, which can be provided by the example analysis tool, allows a web app designer to view code performance characteristics without having to specifically direct the tool to capture and record data. The timeline may be displayed on-demand in a display window. The on-demand display may be provided by the analysis tool without user intervention to re-load the web page, enable recording of the data, or capture the data.

Figure 5:
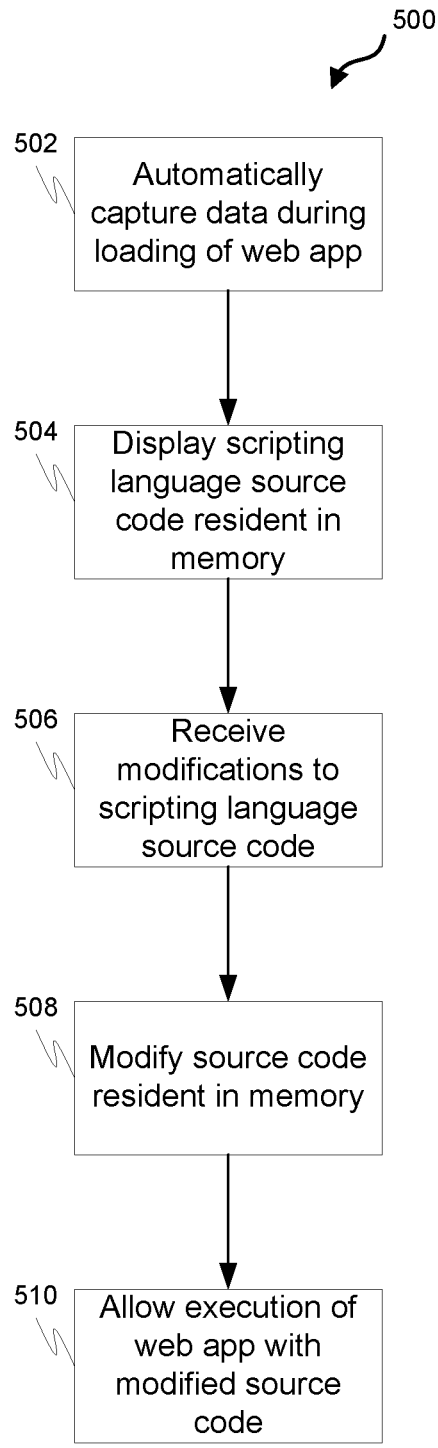
FIG. 5 is a process flow chart depicting another example process performed by an example analysis tool, in accordance with some embodiments.

FIG. 5 is a process flow chart depicting another example process 500 performed by an example analysis tool. An analysis tool may also provide the capability for a web designer to access scripting code resident in memory on the client-side, modify the code resident in the memory, and run the modified code resident in the memory to test possible changes before making a change to the code resident on the server-side.

Scripting language source code is loaded into memory in a client computer during loading of a web app by a client application. The analysis tool captures data that identifies the source code that is loaded into memory and where the code is resident (operation 502). The analysis tool can display in a display window a listing of source code resident in memory resulting from the rendering of a web app by the client application (operation 504). The analysis tool may also allow a user to modify the scripting language source code that is resident in memory. The analysis tool can receive the modifications to the scripting language source code (operation 506), for example, through a user interface that allows the modifications to be reflected in the display window.

The analysis tool can enter the received modifications to the source code resident in memory in the client computer (operation 508). A user may then execute the modified source code and re-render the web app (operation 510). This can allow a web app developer to run and test modified scripting language source code resident in the memory of a client computer before making a change to the code resident on the server-side.

Figure 6:
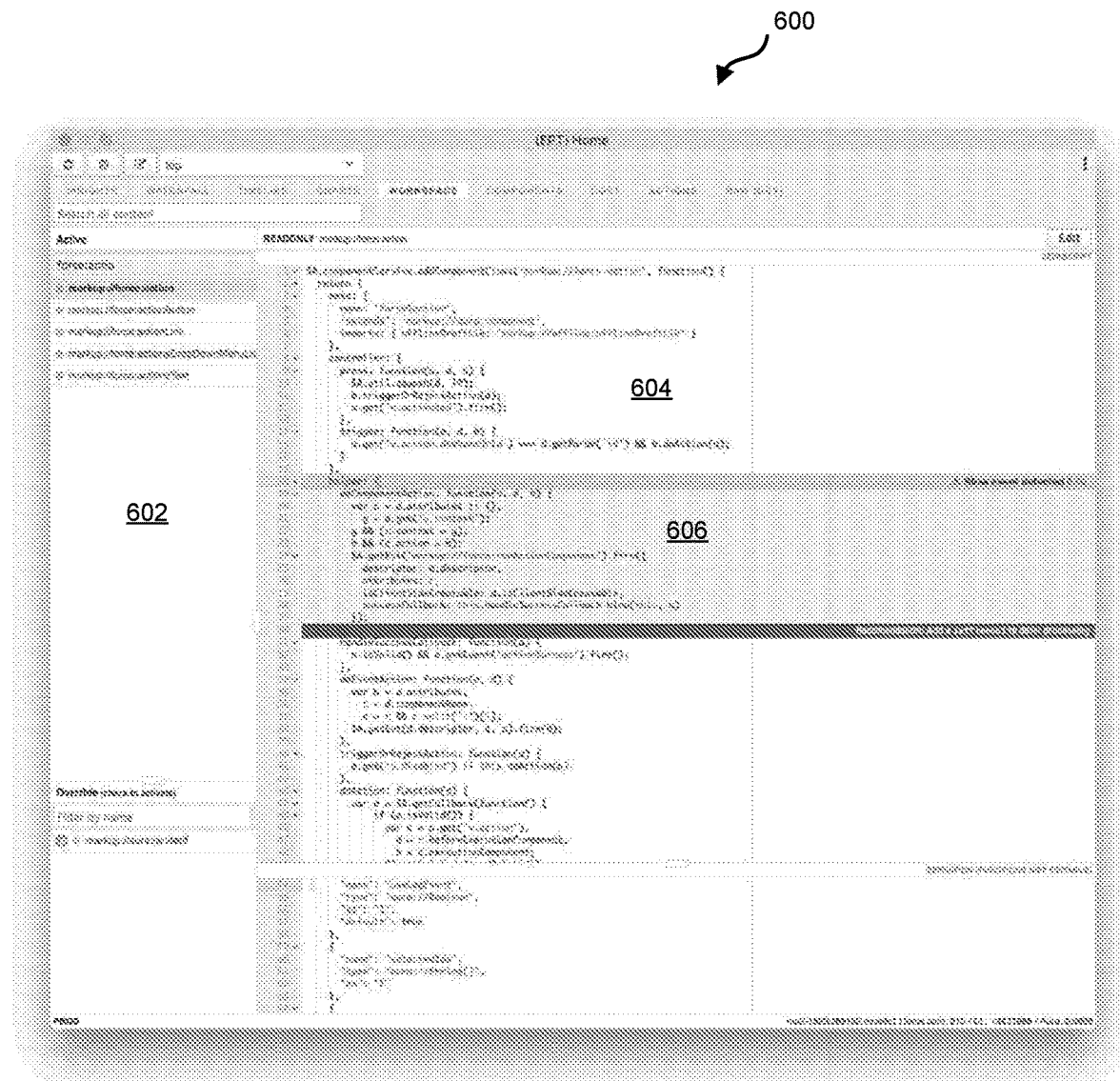
FIG. 6 is a screenshot of an example display window of example scripting code resident in memory in a client computer that may be modified for testing purposes, in accordance with some embodiments.

FIG. 6 is a screenshot of an example display window 600 of example scripting code resident in memory in a client computer that may be modified for testing purposes. The example window 600 includes a first pane 602 that identifies a number of scripting components resident in memory and that a specific scripting component, markup://force:action component, has been selected. The example window 600 further includes a second pane 604 that includes a listing of the source code corresponding to the selected scripting component. The analysis tool may allow a user to modify the code contained in the second pane. In the example shown, the analysis tool has identified and highlighted a code section 606 that may impact client-side performance. A user may modify the highlighted code 606 (or some other code) within the second pane to correct the code to improve client-side performance. The analysis tool can replace the code resident in memory with the modified code and allow the user to re-run the web app with the modified code.

In this example, the scripting code is JavaScript. The analysis tool allows for runtime component execution overrides for the JavaScript with automated code optimization suggestions. In the case of a client application being a web browser, the analysis tool provides a mechanism for overriding the component definitions locally in a user's browser's JavaScript runtime environment allowing a developer to quickly implement and test components. The component source code may be analyzed in the context of the components runtime performance and automated code change suggestions may be provided to make it easier for a web app developer to identify performance issues and modify code that to improve performance.

Figure 7:
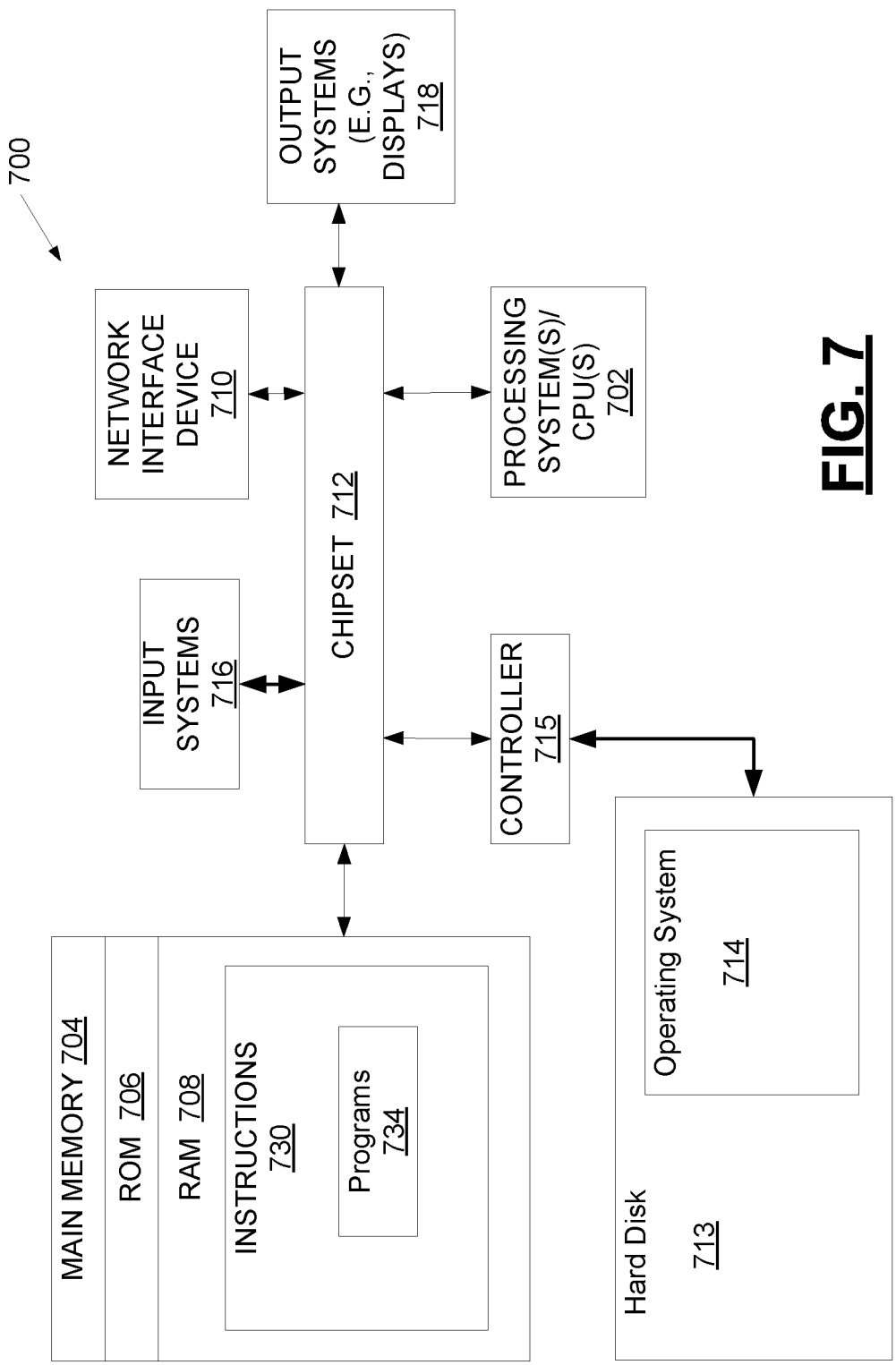
FIG. 7 is a schematic block diagram of an example computer system, in accordance with some embodiments.

FIG. 7 is a schematic block diagram of an example computer system that can be used to implement the techniques and methods described herein. The example computer system can include one or more processing system(s) 702, main memory 704, a network interface device (NID) 710, a chipset 712, a hard disk 713 and hard disk controller 715, input systems 716, and output systems 718.

The chipset 712 is usually located on a motherboard and is a set of electronic components (e.g., in an integrated circuit) that interconnects and manages the data flow between the processing system(s) 702 and other elements of the computer system and connected peripherals. For instance, the chipset 712 provides an interface between the processing system(s) 702 and the main memory 704, and also includes functionality for providing network connectivity through the NID 710, such as a gigabit Ethernet adapter. The chipset 712 typically contains the processor bus interface (also known as a front-side bus), memory controllers, bus controllers, I/O controllers, etc.

Processing system(s) 702 represents one or more general-purpose processing devices such as a microprocessor, central processing unit, or the like. More particularly, the processing system(s) 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 702 may also be one or more special-purpose processing devices such as an application specific integrated circuit (ASIC), a field programmable gate array (FPGA), a digital signal processor (DSP), network processor, or the like.

The processing system(s) 702 can include one or more central processing units (CPUs) that operate in conjunction with the chipset 712. The processing system(s) 702 perform arithmetic and logical operations necessary for the operation of the example computer system.

The NID 710 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 716 (or input device(s)) allow a user to input information to the computer system and can include things such as a keyboard, a mouse or other cursor pointing device, a pen, a voice input device, a touch input device, a webcam device, a microphone, etc. Output system(s) 718 (or output device(s)) present information to the user of the computer system and can include things such as a display, monitor, speakers, or the like.

The chipset 712 can provide an interface to various forms of computer-readable storage media including a main memory 704 (e.g., read-only memory (ROM), flash memory, dynamic random access memory (DRAM) such as synchronous DRAM (SDRAM)), and hard disk 713. The processing system(s) 702 can communicate with the various forms of computer-readable storage media via the chipset 712 and appropriate buses.

A hard disk 713 is a form of non-volatile memory that can store an operating system (OS) 714. The operating system 714 is software that is copied into RAM and executed by the processing system(s) 702 to control the operation of the example computer system, manage computer hardware and software resources, and provide common services for computer programs executed by the processing system(s) 702. Regardless of the implementation, the operating system 714 includes many different "components" that make the different parts of the example computer system work together. The disk controller 715 is the controller circuit which enables the processing system 702 to communicate with a hard disk 713, and provides an interface between the hard disk 713 and the bus connecting it to the rest of the system.

The main memory 704 may be composed of many different types of memory components. The main memory 704 can include non-volatile memory (such as read-only memory (ROM) 706, flash memory, etc.), volatile memory (such as random access memory (RAM) 708), or some combination of the two. The RAM 708 can be any type of suitable random access memory including the various types of dynamic random access memory (DRAM) such as SDRAM, the various types of static RAM (SRAM). The main memory 704 (as well as the processing system(s) 702) may be distributed throughout the example computer system.

The ROM 706 of the main memory 704 can be used to store firmware that includes program code containing the basic routines that help to start up the example computer system and to transfer information between elements within the example computer system. The ROM of the main memory 704 may also store other software components necessary for the operation of the example computer system.

The RAM 708 stores programs/instructions 730 or executable code for one or more programs 734 that can be loaded and executed at processing system(s) 702 to perform various functions. The programs/instructions 730 are computer readable program code that can be stored in RAM 708 (or other a non-transitory computer readable medium of the example computer system) that can be read and executed by processing system(s) 702 to perform various acts, tasks, functions, and steps as described herein. The methods and techniques described herein can be captured in programming instructions 730 for execution by the processing system 702 to cause the example computer system to perform the described methods, processes, and techniques.

The apparatus, systems, methods, techniques and articles described herein allow for the automatic and dynamic analyzing of the client-side performance of a web app and the provision of recommendations to a web app designer to improve the functioning of the web app. An analysis tool is provided that can automatically analyze web page loading on the client-side and provide data and/or recommendations a web app designer can use to improve web app performance on the client-side. The analysis tool may also provide an always-on profiling capability that allows a web app designer to view code performance characteristics without having to specifically direct the tool to capture and record data. The analysis tool may also provide the capability for a web designer to access scripting code resident in memory on the client-side, modify the code resident in the memory, and run the modified code resident in the memory to test possible changes before making a change to the code resident on the server-side.

In one embodiment, a method in an analysis tool executable on a client computer for dynamically analyzing client-side performance during the rendering of web content received from a server is provided. The method comprises automatically capturing data, by the analysis tool, while a client application executes executable code written in a scripting language to render a web page wherein the data identifies components that are created, the execution time for creating each component, the execution start time for each component, and the components that are initially visible when the web page is rendered by the client application. The method further comprises analyzing the captured data, by the analysis tool, as the data is captured to determine a plurality of factors that include the scripting language cycle duration, the identification of redundant code executions, and the prioritization and ordering of code module execution. The method further comprises generating, by the analysis tool, a metric using the factors that characterizes the performance of the client application during the rendering of the web page and displaying the metric in a display window.

These aspects and other embodiments may include one or more of the following features. Generating a metric may comprise generating an insight score that combines the factors according to a formula that takes into account the impact of the factors on the performance of the client application in rendering the web page and displaying the metric may comprise displaying the insight score in a display window in the client application. Generating a metric may comprise generating a loading progress chart that uses the factors to illustrate the percentage of visible and hidden components created at different times during web page rendering and displaying the metric may comprise displaying the loading progress chart in a display window in the client application. Displaying the metric may further comprise displaying a wire frame that identifies which components are visible components and which components are hidden components. The method may further comprise recommending a change in component creation or rendering order to prioritize the rendering of visible components before the rendering of hidden components. The factors may further comprise one or more of an inefficient memory usage analysis factor, a factor identifying code paths that lead to multiple expensive browser render operations and whether these code paths can be better batched, a server time factor, a network overhead factor, a factor identifying overloaded network requests that lead to long response times or large response sizes and whether these network requests can be better batched, and a factor identifying resources such as images, scalable vector graphics (svg), JavaScript (js), and cascading style sheet (css) requests whose delivery can be improved via minification, compression or better cacheability. The analysis tool may be implemented as an extension or plug-in to the client application. The analysis tool may be implemented as a standalone application. The analysis tool may be configured to automate the instrumentation of a framework and user code developed with the framework.

In another embodiment, a method in an analysis tool executable on a client computer for dynamically analyzing client-side performance during the rendering of web content received from a server is provided. The method comprises automatically capturing data, by the analysis tool, while a client application executes executable code written in a scripting language to render a web page wherein the data identifies components that are created, the execution time for creating each component, and the execution start time for each component. The method further comprises automatically generating, by the analysis tool, a timeline that includes a CPU profile of component activity during the rendering of the web page and a memory snapshot that depicts the components loaded during the rendering of the web page and displaying on demand in a display window the timeline that includes the CPU profile and the memory snapshot with a description that highlights key component lifecycle events.

These aspects and other embodiments may include one or more of the following features. The analysis tool may be configured to automate the instrumentation of a framework. The description may comprise higher level component names that are recognizable within the context of the framework. The description may not include machine level component names. Displaying on demand may be performed by the analysis tool without user intervention to re-load the web page, enable recording of the data, or capture the data. The analysis tool may be implemented as an extension or plug-in to the client application. The analysis tool may be implemented as a standalone application.

In another embodiment, a method in an analysis tool executable on a client computer for dynamically analyzing client-side performance during the rendering of web content received from a server is provided. The method comprises automatically capturing, by the analysis tool, scripting language source code of one or more runtime scripting language components loaded in memory in the client computer while a client application executes executable code written in a scripting language to render a web page, displaying in a display window the scripting language source code of one or more of the scripting language components loaded in the memory in the client computer, accepting, by the analysis tool, modifications to one of the scripting language components loaded in the memory in the client computer, entering, by the analysis tool, the modifications to the scripting language component to the memory in the client computer, and causing the client application to execute the modified scripting language component and re-render the web page.

These aspects and other embodiments may include one or more of the following features. The scripting language may comprise JavaScript. The method may further comprise automatically capturing data, by the analysis tool, while the client application executes the modified scripting language component wherein the data identifies the components that are created, the execution time for creating each component, the execution start time for each component, and the components that are initially visible when the web page is re-rendered by the client application. The method may further comprise analyzing the captured data, by the analysis tool, as the data is captured to determine a plurality of factors that include the scripting language cycle duration, the identification of redundant code executions, and the prioritization and ordering of code module execution. The method may further include generating, by the analysis tool, a metric that characterizes the performance of the client application during the rendering of the web page and displaying the metric in a display window. The analysis tool may be implemented as an extension or plug-in to the client application.

In another embodiment, a method in an analysis tool executable on a client computer for dynamically analyzing client-side performance during the rendering of web content received from a server is provided. The method comprises displaying in a display window scripting language source code of one or more scripting language components loaded in memory in the client computer when a client application executed executable code written in a scripting language to render a web page, accepting, by the analysis tool, modifications to one of the scripting language components loaded in the memory in the client computer, entering, by the analysis tool, the modifications to the scripting language component to the memory in the client computer, and causing the client application to execute the modified scripting language component and re-render the web page.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method in an analysis tool that executes on a client computer for dynamically analyzing client-side performance during the rendering of web content received from a server, the method comprising:
   automatically capturing in real-time, by the analysis tool while executing on the client computer, while a client application executes executable code written in a scripting language to render a web page, one or more of data identifying components that are created by the client computer during web page rendering, the execution time on the client computer for creating each component, the execution start time for each component, and the components that are initially visible on the client computer when the web page is rendered by the client application;
   analyzing the captured data, by the analysis tool while executing on the client computer, to determine one or more factors that include one or more of the scripting language cycle duration on the client computer to generate the components, the identification of redundant code executions on the client computer to generate the components, and the prioritization and ordering of code module execution on the client computer to generate the components;
   generating, by the analysis tool while executing on the client computer, a metric using the one or more factors that characterize the performance of the client application during the rendering of the web page; and
   displaying the metric in a display window for viewing by a user at the client computer.

2. The method of claim 1, further comprising:
   automatically generating, by the analysis tool, a timeline that includes a CPU profile of component activity during the rendering of the web page and a memory snapshot that depicts the components loaded during the rendering of the web page.

3. The method of claim 2, further comprising:
   displaying, on demand in the display window, the timeline that includes the CPU profile and the memory snapshot with a description that highlights key component lifecycle events.

4. The method of claim 1 wherein:
   generating a metric comprises generating an insight score that combines the factors according to a formula that takes into account the impact of the factors on the performance of the client application in rendering the web page; and
   displaying the metric comprises displaying the insight score in a display window in the client application.

5. The method of claim 1 wherein:
   generating a metric comprises generating a loading progress chart that uses the factors to illustrate the percentage of visible and hidden components created at different times during web page rendering; and
   displaying the metric comprises displaying the loading progress chart in a display window in the client application.

6. The method of claim 5, wherein displaying the metric further comprises displaying a wire frame that identifies which components are visible components and which components are hidden components.

7. The method of claim 5, further comprising:
   recommending a change in component creation or rendering order to prioritize the rendering of visible components before the rendering of hidden components.

8. The method of claim 1 wherein the factors further comprise one or more of an inefficient memory usage analysis factor, a factor identifying code paths that lead to multiple expensive browser render operations and whether these code paths can be better batched, a server time factor, a network overhead factor, a factor identifying overloaded network requests that lead to long response times or large response sizes and whether these network requests can be better batched, and a factor identifying resources such as images, scalable vector graphics (svg), JavaScript (js), and cascading style sheet (css) requests whose delivery can be improved via minification, compression or better cacheability.

9. The method of claim 1 wherein the analysis tool is implemented as an extension or plug-in to the client application.

10. The method of claim 1 wherein the analysis tool is implemented as a standalone application.

11. The method of claim 1 wherein the analysis tool is configured to automate the instrumentation of a framework and user code developed with the framework.

12. An analysis tool that executes on a client computer for dynamically analyzing client-side performance during the rendering of web content received from a server, the analysis tool comprising one or more processor configured by programming instructions on non-transitory computer readable media to:
- automatically capture in real-time, while executing on the client computer, while a client application executes executable code written in a scripting language to render a web page, one or more of data identifying components that are created by the client computer during web page rendering, the execution time on the client computer for creating each component, the execution start time for each component, and the components that are initially visible on the client computer when the web page is rendered by the client application;
- analyze the captured data, while executing on the client computer, to determine one or more factors that include one or more of the scripting language cycle duration on the client computer to generate the components, the identification of redundant code executions on the client computer to generate the components, and the prioritization and ordering of code module execution on the client computer to generate the components;
- generate, while executing on the client computer, a metric using the one or more factors that characterize the performance of the client application during the rendering of the web page; and
- display the metric in a display window for viewing by a user at the client computer.

13. The analysis tool of claim 12, further configured to:
automatically generate a timeline that includes a CPU profile of component activity during the rendering of the web page and a memory snapshot that depicts the components loaded during the rendering of the web page.

14. The analysis tool of claim 13, further configured to:
display, on demand in the display window, the timeline that includes the CPU profile and the memory snapshot with a description that highlights key component lifecycle events.

15. The analysis tool of claim 12, wherein:
to generate a metric, the analysis tool is configured to generate an insight score that combines the factors according to a formula that takes into account the impact of the factors on the performance of the client application in rendering the web page; and
to display the metric, the analysis tool is configured to display the insight score in a display window in the client application.

16. The analysis tool of claim 12, wherein:
to generate a metric, the analysis tool is configured to generate a loading progress chart that uses the factors to illustrate the percentage of visible and hidden components created at different times during web page rendering; and
to display the metric, the analysis tool is configured to display the loading progress chart in a display window in the client application.

17. The analysis tool of claim 16, wherein to display the metric, the analysis tool is configured to display a wire frame that identifies which components are visible components and which components are hidden components.

18. The analysis tool of claim 16, further configured to:
recommend a change in component creation or rendering order to prioritize the rendering of visible components before the rendering of hidden components.

19. The analysis tool of claim 12, wherein the factors further comprise one or more of an inefficient memory usage analysis factor, a factor identifying code paths that lead to multiple expensive browser render operations and whether these code paths can be better batched, a server time factor, a network overhead factor, a factor identifying overloaded network requests that lead to long response times or large response sizes and whether these network requests can be better batched, and a factor identifying resources such as images, scalable vector graphics (svg), JavaScript (js), and cascading style sheet (css) requests whose delivery can be improved via minification, compression or better cacheability.

20. Non-transitory computer readable media encoded with programming instructions configurable to perform a method in an analysis tool that executes on a client computer for dynamically analyzing client-side performance during the rendering of web content received from a server, the method comprising:
- automatically capturing in real-time, by the analysis tool while executing on the client computer, while a client application executes executable code written in a scripting language to render a web page, one or more of data identifying components that are created by the client computer during web page rendering, the execution time on the client computer for creating each component, the execution start time for each component, and the components that are initially visible on the client computer when the web page is rendered by the client application;
- analyzing the captured data, by the analysis tool while executing on the client computer, to determine one or more factors that include one or more of the scripting language cycle duration on the client computer to generate the components, the identification of redundant code executions on the client computer to generate the components, and the prioritization and ordering of code module execution on the client computer to generate the components;
- generating, by the analysis tool while executing on the client computer, a metric using the one or more factors that characterize the performance of the client application during the rendering of the web page; and
- displaying the metric in a display window for viewing by a user at the client computer.

* * * * *